US009654385B2

(12) United States Patent
Chu et al.

(10) Patent No.: US 9,654,385 B2
(45) Date of Patent: May 16, 2017

(54) MULTICAST MULTIPATHING IN AN IP OVERLAY NETWORK

(71) Applicant: Cisco Technology, Inc., San Jose, CA (US)

(72) Inventors: Kit Chiu Chu, Fremont, CA (US); Thomas J. Edsall, Los Gatos, CA (US); Navindra Yadav, Cupertino, CA (US); Francisco M. Matus, Saratoga, CA (US); Krishna Doddapaneni, Cupertino, CA (US); Satyam Sinha, Sunnyvale, CA (US); Sameer Merchant, Sunnyvale, CA (US)

(73) Assignee: Cisco Technology, Inc, San Jose, CA (US)

( * ) Notice: Subject to any disclaimer, the term of this patent is extended or adjusted under 35 U.S.C. 154(b) by 362 days.

(21) Appl. No.: 14/508,779

(22) Filed: Oct. 7, 2014

(65) Prior Publication Data
US 2015/0127701 A1 May 7, 2015

Related U.S. Application Data

(60) Provisional application No. 61/900,333, filed on Nov. 5, 2013.

(51) Int. Cl.
*H04L 12/703* (2013.01)
*H04L 12/26* (2006.01)
(Continued)

(52) U.S. Cl.
CPC .......... *H04L 45/28* (2013.01); *H04L 12/4633* (2013.01); *H04L 12/4641* (2013.01);
(Continued)

(58) Field of Classification Search
CPC ............. H04L 12/4633; H04L 12/4641; H04L 43/0852; H04L 43/0894; H04L 43/16;
(Continued)

(56) References Cited

U.S. PATENT DOCUMENTS 6,230,231 B1 * 5/2001 DeLong .............. H04L 12/4641
711/200
6,769,033 B1 * 7/2004 Bass ....................... G06F 15/80
709/246

(Continued)

FOREIGN PATENT DOCUMENTS

WO    WO 2006/101668    9/2006
WO    WO 2009/115480    9/2009

OTHER PUBLICATIONS

International Search Report and Written Opinion for PCT/US2014/063555, mailed Feb. 5, 2015, 10 pages.

(Continued)

*Primary Examiner* — Michael C Lai
(74) *Attorney, Agent, or Firm* — Polsinelli LLP (57) ABSTRACT

The subject technology addresses the need in the art for improving utilization of network bandwidth in a multicast network environment. More specifically, the disclosed technology addresses the need in the art for extending multipathing to tenant multicast traffic in an IP overlay network, which enables the network to fully utilize available bandwidth for multicast traffic. In some examples, nodes in the overlay network may be connected by virtual or logical links, each of which corresponds to a path, perhaps through many physical links, in the underlying network.

18 Claims, 8 Drawing Sheets

(51) Int. Cl.
　　　*H04L 12/46*　　　(2006.01)
　　　*H04L 12/741*　　(2013.01)
　　　*H04L 29/12*　　　(2006.01)
　　　*H04L 12/751*　　(2013.01)
　　　*H04L 29/06*　　　(2006.01)
　　　*H04L 12/58*　　　(2006.01)
　　　*H04L 29/08*　　　(2006.01)
　　　*H04L 12/707*　　(2013.01)
　　　*H04L 12/709*　　(2013.01)
　　　*H04L 12/723*　　(2013.01)

(52) U.S. Cl.
　　　CPC ...... *H04L 43/0852* (2013.01); *H04L 43/0894* (2013.01); *H04L 43/16* (2013.01); *H04L 45/02* (2013.01); *H04L 45/22* (2013.01); *H04L 45/245* (2013.01); *H04L 45/50* (2013.01); *H04L 45/745* (2013.01); *H04L 51/14* (2013.01); *H04L 61/2503* (2013.01); *H04L 67/10* (2013.01); *H04L 69/22* (2013.01)

(58) Field of Classification Search
　　　CPC ....... H04L 45/02; H04L 45/22; H04L 45/245; H04L 45/28; H04L 45/50; H04L 45/745; H04L 51/14; H04L 61/2503; H04L 67/10; H04L 69/22; H04L 2212/0025
　　　See application file for complete search history.

(56) References Cited

U.S. PATENT DOCUMENTS

| | | | |
|---|---|---|---|
| 7,379,459 | B2 | 5/2008 | Ohnishi |
| 7,742,406 | B1 * | 6/2010 | Muppala ............ H04L 41/5022 370/230 |
| 7,940,763 | B1 * | 5/2011 | Kastenholz ......... H04L 12/2856 370/255 |
| 8,190,843 | B1 | 5/2012 | de Forest et al. |
| 8,874,876 | B2 * | 10/2014 | Bhadra ................ H04L 49/356 370/392 |
| 9,053,070 | B1 | 6/2015 | Arguelles |
| 2003/0123462 | A1 | 7/2003 | Kusayanagi |
| 2006/0183488 | A1 | 8/2006 | Billhartz |
| 2007/0133566 | A1 | 6/2007 | Copps |
| 2008/0243495 | A1 | 10/2008 | Anandakumar et al. |
| 2009/0086629 | A1 | 4/2009 | Zhang et al. |
| 2009/0238179 | A1 | 9/2009 | Samprathi |
| 2011/0007638 | A1 | 1/2011 | Xu et al. |
| 2011/0213894 | A1 | 9/2011 | Silberstein et al. |
| 2011/0268118 | A1 * | 11/2011 | Schlansker ......... H04L 12/4641 370/392 |
| 2011/0274053 | A1 | 11/2011 | Baik et al. |
| 2011/0286324 | A1 | 11/2011 | Bellagamba et al. |
| 2013/0100810 | A1 | 4/2013 | Slothouber |
| 2013/0107889 | A1 | 5/2013 | Barabash et al. |
| 2013/0121172 | A1 | 5/2013 | Cheng et al. |
| 2013/0155846 | A1 | 6/2013 | Ramachandran et al. |
| 2013/0311637 | A1 | 11/2013 | Kamath et al. |
| 2013/0322453 | A1 | 12/2013 | Allan |
| 2014/0064278 | A1 | 3/2014 | G. Santos et al. |
| 2014/0086253 | A1 | 3/2014 | Yong |
| 2014/0269705 | A1 | 9/2014 | DeCusatis et al. |
| 2014/0269710 | A1 | 9/2014 | Sundaram et al. |
| 2015/0009992 | A1 | 1/2015 | Zhang |
| 2015/0058470 | A1 | 2/2015 | Duda |
| 2015/0073920 | A1 | 3/2015 | Pashkevich et al. |
| 2015/0082418 | A1 | 3/2015 | Gu |
| 2015/0103679 | A1 | 4/2015 | Tessmer et al. |
| 2015/0124590 | A1 | 5/2015 | Chu et al. |
| 2015/0124640 | A1 | 5/2015 | Chu et al. |
| 2015/0124821 | A1 | 5/2015 | Chu et al. |
| 2015/0124822 | A1 | 5/2015 | Chu et al. |
| 2015/0188769 | A1 | 7/2015 | Gu |
| 2015/0222516 | A1 | 8/2015 | Deval et al. |

OTHER PUBLICATIONS

Cisco Systems, Inc., "Cisco Nexus 1000V VXLAN Configuration Guide, Release 4.2(1)5V2(2.1), Chapter 1, Information About VXLANs," Jun. 21, 2013, 6 pages.
Onisick, Joe, "VXLAN Deep Dive," Genesis Framework, Wordpress, Nov. 6, 2012, 8 pages.
VMware, Inc., "VMware Network Virtualization Design Guide, Technical White Paper," Jan. 2013, 25 pages.

* cited by examiner

MULTICAST MULTIPATHING IN AN IP OVERLAY NETWORK

CLAIM TO PRIORITY

This application claims priority to U.S. provisional application No. 61/900,333 filed on Nov. 5, 2013, which is expressly incorporated by reference herein in its entirety.

BACKGROUND

Multipathing allows a source to utilize multiple paths to forward packet(s) toward its destination. Multipathing allows traffic to utilize available bandwidth in the network, and has been used extensively for IP unicast forwarding. Even though one can achieve similar bandwidth utilization benefits by extending multipathing to multicast, support for multipathing for multicast has been lacking because multicast forwarding involves putting traffic on a multicast group into a distribution tree in which the traffic must strictly follow in order to avoid loops.

BRIEF DESCRIPTION OF THE DRAWINGS

The embodiments of the present technology will hereinafter be described in conjunction with the appended drawings, provided to illustrate and not to limit the technology, wherein like designations denote like elements, and in which.

DETAILED DESCRIPTION

Systems and methods in accordance with various embodiments of the present disclosure may overcome one or more deficiencies experienced in existing approaches to managing multicast traffic throughout an overlay network.
Overview Embodiments of the subject technology provide for receiving, over a network interface at an ingress leaf switch, a multicast packet for distributing over an overlay network. A hash operation or algorithm is performed on at least a portion of the multicast packet to determine a hash key. Based at least on the hash key, a forwarding tag (FTAG) value is selected. An overlay multicast group value is then concatenated with the FTAG value to provide a destination address. The multicast packet is encapsulated with the concatenated overlay multicast group value and the FTAG value. The encapsulated multicast packet is forwarded to a network element or device located at a next-hop from the ingress leaf switch.

DESCRIPTION OF EXAMPLE EMBODIMENTS

The disclosed technology addresses the need in the art for improving utilization of network bandwidth in a multicast network environment. More specifically, the disclosed technology addresses the need in the art for extending multipathing to tenant multicast traffic in an IP overlay network, which enables the network to fully utilize available bandwidth for multicast traffic. As used herein, an overlay network is a computer network that is built on the top of another network (e.g., underlying network). In some examples, nodes in the overlay network may be connected by virtual or logical links, each of which corresponds to a path, perhaps through many physical links, in the underlying network.

Examples of Multicast Multipathing in an Overlay Network

Embodiments to support multicast multipathing in an overlay network fabric is described in the following details.

Digital communications networks, such as local or wide area networks (LANs, WANs), the Internet, etc., are networks for permitting information stored at one location to be distributed to one or more users situated at geographically different locations. The information (also referred to herein as a "message" or "packet" or "datagram") can take any of a number of forms including, but not limited to, text, still image, audio, and video information.

Digital communications networks may operate under the principal of point-to-point or connection-oriented communications (e.g., utilizing TCP/IP) in which information may be exchanged between one sending device and one receiving device. This manner of connectivity ensures reliability by establishing a connection between each and every receiving device using a connection based protocol. Unique connections are formed with each device if communication with multiple receiver devices is desired. However, the overhead incurred with creating and managing a connection between a sending device and a number of receiving devices may be prohibitively expensive when a large number of receiving devices are included.

Connectionless protocols have been developed for reducing the overhead associated with connection based protocols, such as UDP (user datagram protocol) over an IP network. Under a connectionless communication between two network end points, a message can be sent from one end point to another without prior arrangement. A computing device at one end of the communication transmits data addressed to the other, without first ensuring that the receiver is available and ready to receive the data. These connectionless protocols may rely on a broadcast or "multicast" model where a single message is broadcast to a multiple receiving devices without forming a connection with the individual systems. Multicasting enables a source to transmit messages to multiple receivers that have been collectively identified by a single IP destination address, rather than to each of the receivers' unique IP address individually.

In at least one embodiment, routing of data for multicasting may be controlled by routing protocols. For instance, Protocol-Independent Multicast (PIM) is a family of multicast routing protocols that can provide one-to-many distribution of data over the Internet. In one example, PIM is used to create multicast distribution trees, which in turn are used to forward multicast data packets.

A source tree is a form of a multicast distribution tree that includes one or more nodes representing various devices. For instance, a source device of multicast traffic is located at a node corresponding to the root of the source tree, receiver device(s) are nodes located at the ends of the branches of the source tree, and middle device(s), if any, are nodes located between the root and receiver device(s). Multicast traffic, in some examples, travels from the source device through the tree toward one or more receiver devices. However, the traffic follows a strict path according to the source tree and multiple paths are not provided without modification(s). Thus, load balancing of multicast traffic is not possible in such cases and network bandwidth utilization may not be optimized (e.g., traffic is heavy over certain nodes while other nodes are underutilized).

In at least one embodiment, an overlay network treats nodes at the edge of the network fabric as tunnel endpoints. As a packet enters tunnel endpoint, the packet is encapsulated in accordance to the techniques described herein before it enters the network. As used herein, the phrase "network fabric" refers to a one or more network elements, forming a network, including switches, routers, servers, storage devices, or one or more components of a network device such as one or more network ports of a switch or router, etc.

Based on a given overlay network topology, multiple distribution trees for all tunnel endpoints are created in the overlay network. Each one of these distribution trees may be associated with a forwarding tag value (FTAG). In some examples, a number of distribution trees may depend on the network topology and be a tradeoff between protocol overhead and overall load balancing performance, etc.

In the case of an IP overlay network such as a Virtual Extensible LAN (VXLAN), there is currently no concept of multicast multipathing. Each tenant multicast group is mapped to an overlay multicast group, and the overlay multicast group would be routed at the IP layer in the same manner as in non-overlay cases. Therefore, the IP overlay network faces the same issue as the non-overlay case(s) and does not support multicast multipathing without modification(s).

In at least one embodiment, VXLAN is a standard network virtualization technology and works by creating a logical layer-2 network that is overlaid above a layer-3 IP network. Ethernet packets (e.g., generated by VMs) are encapsulated in an IP header before the packets are transported to a remote location where the IP header is removed and the original Ethernet packet is delivered to the destination. The IP encapsulation mechanism allows a logical layer-2 broadcast domain to be extended to an arbitrary number of remote locations, and allows different data centers or different sections of the same data center (and hence the VMs and devices therein) to be in the same layer-2 broadcast domain.

In at least one embodiment, when a tenant multicast packet (e.g., an original Ethernet frame including the multicast packet in the payload portion in an embodiment) initially enters a tunnel endpoint switch (e.g., a switch acting as a VXLAN Tunnel End Point in a given overlay network), one of the aforementioned distribution trees would be selected based on a hash of the flow information. Such flow information may include, but is not limited to, information in the header such as IP address (e.g., source and/or destination address), and/or other information not included in the IP header (but included elsewhere in the original Ethernet frame) such as UDP port number, TCP port number, etc. This approach may be similar to how a given switch performs load balancing unicast traffic onto different paths, except that a "path" is represented or defined by a distribution tree when performing multicasting. In addition to the distribution tree, the switch may look up the tenant multicast group information and derive an overlay multicast group as described in a given VXLAN.

Unlike a VXLAN implementation where the overlay multicast group directly maps into an overlay IP destination address (e.g., corresponding to a multicast group address in the overlay network), the switch in at least one embodiment would generate an IP destination address for the overlay network by concatenating the overlay multicast group value (e.g., a multicast group address in an example) with the selected FTAG value. In one example, the lower 4 bits of an outer IP destination address included in a VXLAN header is used as the selected FTAG value, which is then encapsulated onto the original Ethernet frame that includes the multicast packet. This effectively puts an explicit indication of which distribution tree this particular multicast packet should be forwarded on (e.g., the "path") throughout the overlay network.

The overlay multicast group therefore could be used to derive at least 2 pieces of information. The non-FTAG portion is used to derive a "fanout" list indicating where receivers exist for the multicast group in the overlay network. The FTAG portion is used to derive the "fanout" list of the multicast distribution tree which is used to prevent loops. These 2 fanout lists undergo an AND operation together to produce the final fanout list. In other words, the final fanout list would include interfaces where receivers exist and are part of the distribution tree.

Upon receiving an encapsulated packet, other switches in the overlay network may look up the overlay IP destination address and perform multicast replication of the packet (e.g., to forward the packet to respective destination(s)). Hashing of the encapsulated packet is not performed by these other switches. Because the FTAG is now part of the outer IP destination address in the VXLAN header, the fanout list can be derived base on the combination of FTAG and the overlay multicast group. In this manner, a single multicast packet is ensured to follow the path provided in a single distribution tree throughout the network to avoid a forwarding loop. Additionally, in some examples, an incoming interface pruning still applies similar to any multicast distribution mechanism to ensure the multicast is not replicated back to the source.

In order to avoid including duplicate overlay IP destination addresses in the forwarding table for the same overlay multicast group, the switch can implement a FTAG pruning mechanism. Before the IP destination address is used for a lookup in the forwarding table, the FTAG part of the IP destination address would be zeroed out first (e.g., to effectively remove the FTAG). Because the FTAG was removed from the IP destination address before lookup, the forwarding table only needs to have 1 entry per overlay multicast group. The result of this lookup would return a receiver fanout list (e.g., all potential receivers in the multicast group in an example) for this overlay multicast group irrespective of the FTAG (e.g., since the FTAG was effectively removed by being zeroed out). To ensure that the packet still follows the distribution tree associated with the FTAG, this receiver fanout list would be pruned based on the FTAG fanout list (e.g., the receiver fanout list would undergo an AND operation with the FTAG distribution tree fanout list) and the final result would be used for packet replication instead.

With the above-described mechanism, the subject technology may perform load balancing for multicast traffic into multiple distribution trees of an IP overlay network to fully utilize bandwidth available in the overlay network.

Example Network Environment

Figure 1:
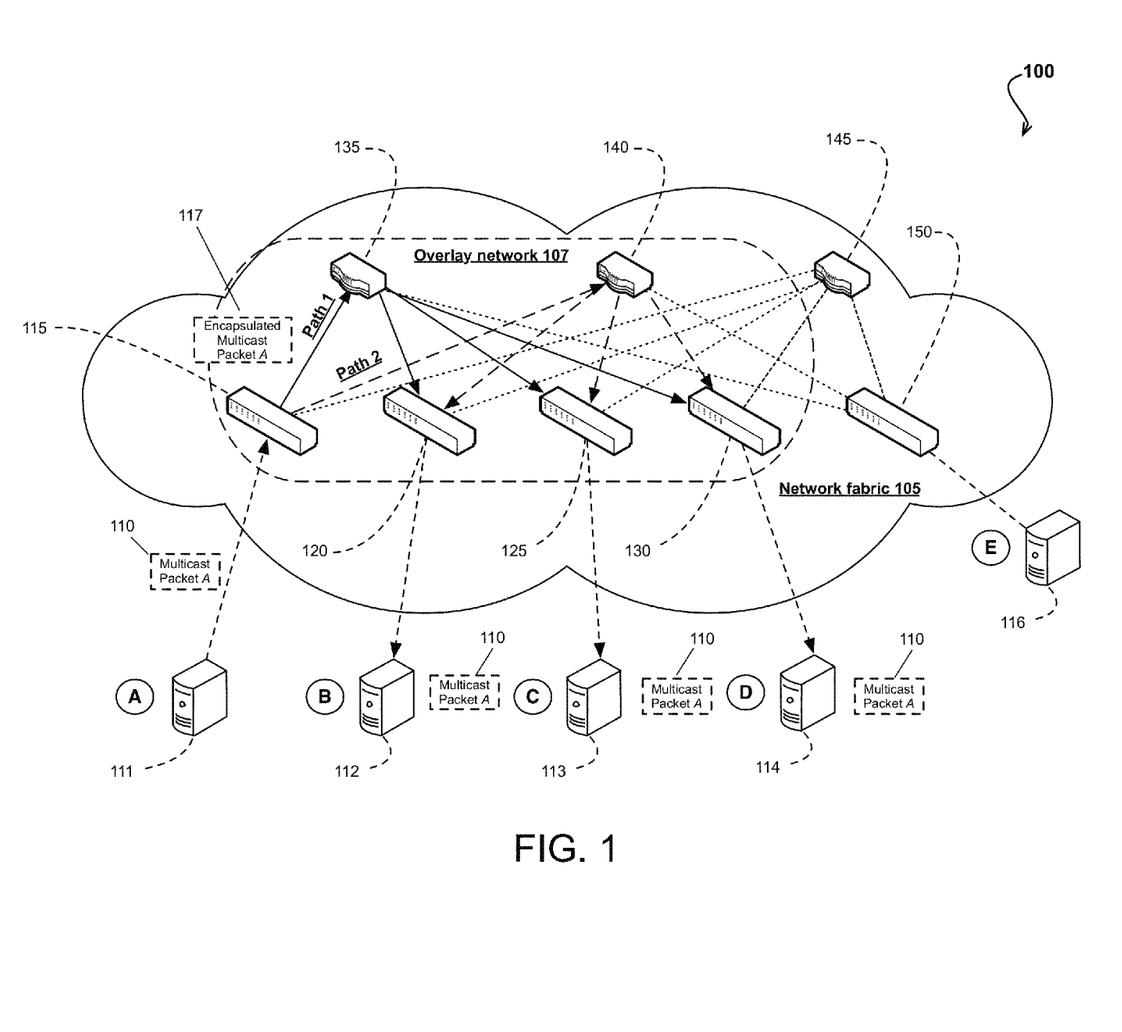
FIG. 1 shows an example network environment including several network elements or nodes (e.g., network devices such as switches, routers, servers, storage device, etc.) in accordance with some embodiments of the subject technology.

FIG. 1 shows an example network environment 100 including several network elements or nodes (e.g., network devices such as switches, routers, servers, storage device, etc.). In the example of FIG. 1, a client computer 111 ("A") represents a starting point for a multicast packet 110 ("Multicast Packet A") that is transmitted from the client computer 111 into a network fabric 105. Although the multicast packet 110 is mentioned in the discussion of FIG. 1, it is appreciated that other types of data traffic may be contemplated and still be within the scope of the subject technology. Further, in some embodiments, the multicast packet 110 may be included or encapsulated in other data, such as an Ethernet or VXLAN frame, etc., as discussed herein.

The network fabric 105 in FIG. 1 includes network elements 115, 120, 125, 130, 135, 140, 145 and 150 that form a network for forwarding the multicast packet 110 to its intended destination multicast group, including respective client computers representing a destination point for the multicast packet 110. For the sake of simplicity and for clarity of discussion, a single packet (and copies thereof) is described in the example of FIG. 1. However, it is appreciated that embodiments described herein are applicable to multiple packets that are transmitted from one or more source computers or devices and received, respectively, by one or more intended destination computers or devices.

In the example network fabric 105 of FIG. 1, the network elements 115, 120, 125, 130 and 150 represent "leaf" switches and may be considered tunnel endpoints, or as referred to in VXLAN terminology, a VXLAN Tunnel End Point (VTEP). The network elements 135, 140 and 145 may represent "spine" switches. As shown, the network elements included in the overlay network 107 form a bipartite graph in which every leaf switch connects to every spine switch and every spine switch connects to every leaf switch. It is appreciated that more network elements or less network elements may be provided and still be within the scope of the subject technology. Within the network fabric 105, one or more overlay networks may be provided such as an overlay network 107 that includes the network elements 115, 120, 125, 130, 135 and 140 (and does not include the network elements 145 and 150). As further shown, client computers 111 ("A"), 112 ("B"), 113 ("C"), 114 ("D") and 116 ("E") are respectively connected to the network elements 115, 120, 125, 130 and 150 representing different VTEPs.

As further illustrated in FIG. 1, the multicast packet 110 is transmitted into the network fabric 105 and received by the network element 115 corresponding to a respective leaf switch. In at least one embodiment, the network element 115, acting as the entry point into the network fabric 105, determines a multicast distribution tree (among a plurality of such trees) for forwarding the packet 115 through the overlay network 107. As mentioned before, multiple multicast distribution trees may be provided to forward multicast packet(s) through an overlay network. Each one of these multicast distribution trees may be associated with a forwarding tag value (FTAG) in at least one embodiment, which is further described below.

In the example overlay network 107 of FIG. 1, a first multicast distribution tree may include a spine switch corresponding to the network element 135 (e.g., a root node of the first tree) and include leaf switches corresponding to the network elements 115, 120, 125 and 130 (e.g., leaf nodes of the first tree) for delivering the multicast packet including the client computers 111 ("A"), 112 ("B"), 113 ("C") and 114 ("D").

A second multicast distribution tree may include a spine switch corresponding to the network element 140 (e.g., a root node of the second tree) and include leaf switches corresponding to the network elements 115, 120, 125 and 130 (e.g., leaf nodes of the second tree) for delivering the multicast packet including the client computers 111, 112, 113 and 114. Thus, in the example of FIG. 1, the multicast packet 110 may be distributed throughout the overlay network 107 using a respective distribution tree that defines a path for the multicast traffic to reach its intended receivers. Also note that the network elements 145 (spine switch) and 150 (leaf switch or VTEP) and the client computer 116 are not included in in the example overlay network 107 of FIG. 1 and a given distribution tree may not include the aforementioned network elements as part of its path.

Depending on the multicast distribution tree that is selected, the multicast packet 110 may be forwarded to different network elements in the network fabric 105 depending on which respective network elements are included in the selected distribution tree. For instance, in a first selected distribution tree, the multicast packet 110 may be forwarded along a first path ("Path 1") to the network element 135 representing a spine switch, and then sent to the network elements 120, 125, and 130 representing respective leaf switches. Alternatively, in a second selected distribution tree, the multicast packet 110 may be forwarded along a second path ("Path 2") to the network element 140 representing another spine switch and then sent to the network elements 120, 125 and 130 representing respective leaf switches. In the example first and second distributions trees described before, the network elements 120, 125 and 130 may represent respective leaf switches that considered a group of intended receivers of the multicast packet 110.

Figure 2:
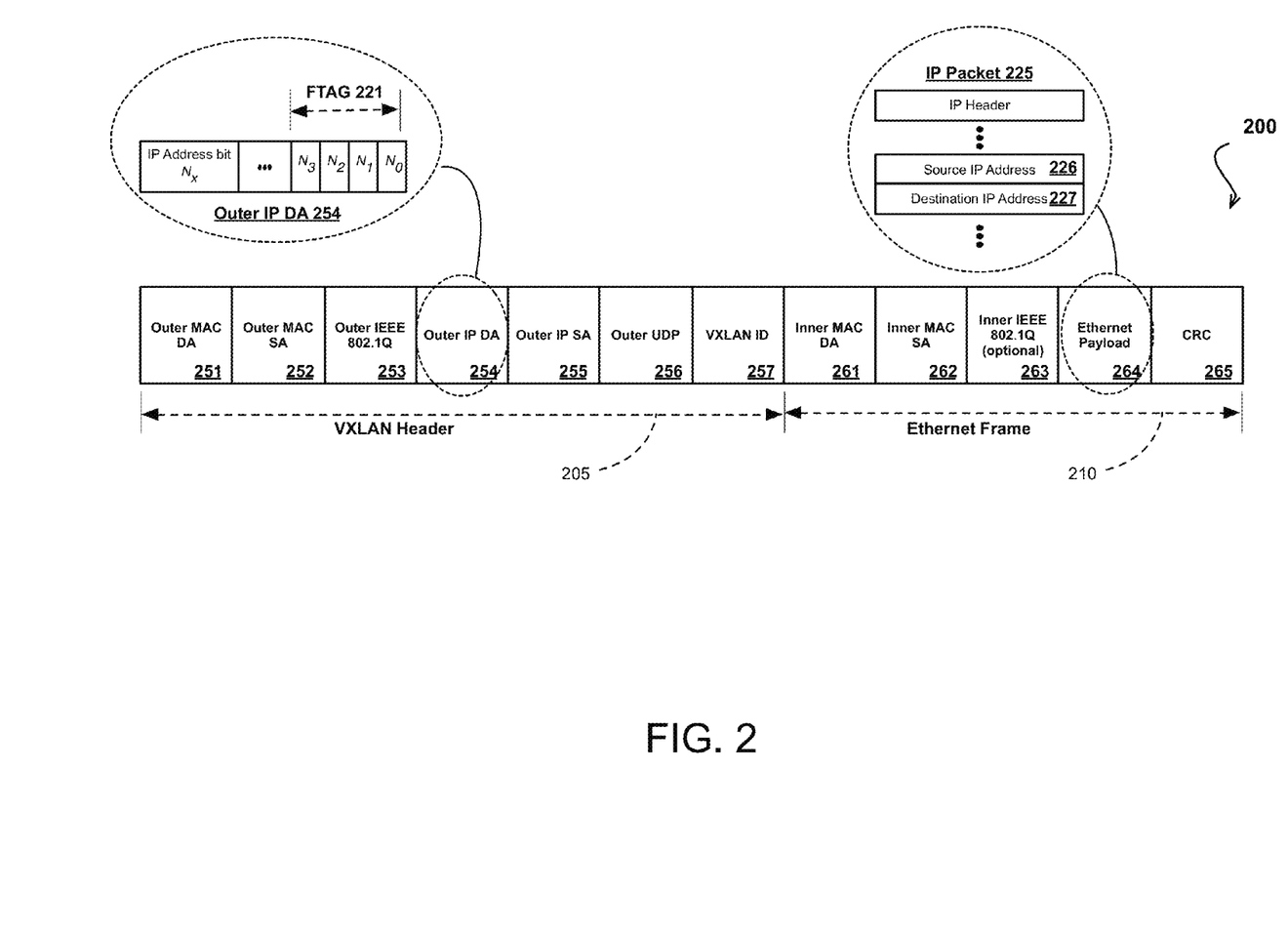
FIG. 2 is an example Ethernet frame that has been encapsulated with a VXLAN header in accordance with some embodiments of the subject technology.

In one example, the network element 115 receives an incoming multicast packet 110 from the client computer 111 (e.g., hosting a VM), for example an Ethernet frame that includes in its payload, an IP multicast packet, such as Ethernet frame 210 shown in FIG. 2. In this regard, FIG. 2 is an example Ethernet frame that has been encapsulated with a VXLAN header in accordance with some embodiments of the subject technology. FIG. 2 will be described by reference portions of FIG. 1 in the following discussion.

As shown in FIG. 2, the Ethernet frame 210 may include an inner MAC destination address (DA) 261, an inner MAC source address (SA) 262 for the source or sender of the Ethernet frame 210, an optional inner IEEE 802.1Q standard header 263, Ethernet payload 264, and a cyclic redundancy check (CRC) field 265. Referring back to FIG. 1, the multicast packet 110 (including the Ethernet frame 210 in FIG. 2) may have originated from the client computer 111, which in at least one embodiment, includes a virtual machine (VM) running on or hosted by the client computer 111.

As mentioned before, when the multicast packet 110 first enters a tunnel endpoint switch (e.g., an ingress switch acting as a VXLAN Tunnel End Point (VTEP)) in the overlay network 107, one of the aforementioned distribution trees can be selected based on a hash of "flow information" included in the Ethernet frame 210 corresponding to a "flow" of packets. In at least one embodiment, the aforementioned flow information may include, but is not limited to, information in the header such as IP address (e.g., source and/or destination address), UDP port number, TCP port number, etc.

Now referring to FIG. 2, the Ethernet payload included in the Ethernet frame 210 includes an IP packet 225, which further includes a source IP address 226 and a destination IP address 227 in an IP header. It is appreciated that the IP packet 225 may include other types of data and still be within the scope of the subject technology. For example, the IP header may include fields of information for data corresponding to version, traffic class, flow label, payload length, next header, hop limit, etc., or any other appropriate field included in an IPv4 or IPv6 header. Thus, a flow may be uniquely identified by a combination of a source IP address and a flow label in an example, and IP packets in the same flow will also have the same source IP address and the same flow label in at least one embodiment. Although the above example describes the inclusion of an IP packet in the Ethernet payload, it is appreciated that other types of packets may also be included. In an example, an L2 multi-destination packet may be included in the Ethernet payload.

In an example, the ingress switch corresponding to the network element 115 uses a hashing algorithm to determine which FTAG to include in a VXLAN header. The hashing algorithm may use any appropriate technique to generate a hash key based on the information provided in at least the IP header. In the example overlay network 107 of FIG. 1, two multi-destination or multicast distribution trees respectively correspond to a first FTAG value or a second FTAG value which each represent an unique ID associated to the respective multicast tree. For the purpose of the following discussion, it is assumed that a multicast distribution tree corresponding to "Path 1" as shown in FIG. 1 has be selected based on the generated hash key, and that the network element 135 corresponding to a spine switch represents a rode node of this multicast distribution tree.

Once the FTAG is determined and the multicast tree is selected, the network element 115 may proceed with encapsulating the Ethernet frame 210 in FIG. 2 with a VXLAN header. For example, the network element 115 appends to the Ethernet frame 210 a VXLAN header 260 as shown. In an embodiment, the VXLAN header 205 includes an outer MAC destination address (DA) 251, an outer MAC source address (SA) 252, an optional outer IEEE 802.1Q standard header 253, an outer IP destination address (DA) 254, an outer IP source address (SA) 255, an outer User Datagram Protocol (UDP) 256, and a VXLAN ID 257.

In at least one embodiment, the network element 115 may construct an IP destination address for the outer IP DA 254 by concatenating the overlay multicast group value (e.g., a multicast group address in an example) with the FTAG value. Referring to FIG. 2 now, a FTAG 221 represents 4 bits of information (e.g., for a total of 16 possible values in binary) corresponding to the multicast distribution tree (e.g., the selected path) at the lower end (e.g., least significant bits) of the outer IP DA 254. The remaining portion of the outer IP DA 254 represents the overlay multicast group address. As mentioned before, by using this technique, an explicit indication of which distribution tree this multicast packet should be forwarded on over the overlay network 107 is now included in the encapsulated multicast packet.

Referring to FIG. 1, once a FTAG is determined by the ingress leaf switch corresponding to the network element 115 and included in the encapsulated packet as part of the outer IP DA 254, the rest of the network elements in the overlay network 107 may forward the multicast packet 110 based on the selected FTAG. As mentioned before, the selected FTAG corresponds to a multicast distribution tree provided by the overlay network 107. Once the root switch receives the packet, it forwards it to all switches in that FTAG except the switch from which it was received. Referring to FIG. 1, the network element 115 representing the ingress leaf switch may then forward an encapsulated packet 117 to the network element 135 representing the root spine switch associated with the selected multicast tree based on the FTAG.

Upon receiving the encapsulated packet 177, the aforementioned root spine switch may then look up the overlay IP destination address (e.g., as included in the outer IP DA in the VXLAN header of the encapsulated packet 117) and perform multicast replication of the encapsulated packet 117 (e.g., to forward the packet to respective destination(s)). Hashing of the encapsulated packet is not performed by this root spine switch corresponding to the network element 135. Because the FTAG is now part of the outer IP destination address in the VXLAN header, the fanout list can be derived base on the combination of FTAG and the overlay multicast group. In this manner, a single multicast packet is ensured to follow the path provided in a single distribution tree throughout the network to avoid a forwarding loop. Additionally, in some examples, an incoming interface pruning still applies similar to any multicast distribution mechanism to ensure the multicast is not replicated back to the source.

Further, in order to avoid including duplicate overlay IP destination addresses in the forwarding table for the same overlay multicast group, the switch can implement a FTAG pruning mechanism. Before the IP destination address is used for a lookup in the forwarding table, the FTAG part of the IP destination address may be zeroed out first. Because the FTAG was removed from the IP destination address before lookup, the forwarding table only needs to have 1 entry per overlay multicast group. The result of this lookup would return a receiver fanout list for this overlay multicast group irrespective of the FTAG (e.g., since the FTAG was effectively removed by being zeroed out). To ensure that the packet still follows the distribution tree associated with the FTAG, this fanout list may be pruned based on the FTAG fanout list and the final result may be used for packet replication instead.

The overlay multicast group therefore could be used to derive a "fanout" list that indicates where receivers may exist in the overlay network 107. This fanout list may be masked with the FTAG fanout list and the packet may be replicated on the final unmasked ports, with an overlay VXLAN encapsulation.

Using at least information included in the fanout list and the forwarding table for the multicast distribution tree, the root spine switch corresponding to the network element 135 forwards the encapsulated packet 117 to respective leaf switches or VTEPs corresponding to the network elements 120, 125 and 130 of the overlay network 107. At each of the network elements 120, 125 and 130 corresponding to respective VTEPs, the encapsulated packet 117 may be decapsulated (e.g., by removing the VXLAN header) to provide a copy of the multicast packet (e.g., as included in the original Ethernet frame discussed above) and then forwarded to the clients computers 112, 113, and 114 that represent receivers of the multicast packet. In this regard, each leaf switch or VTEP looks at the VXLAN header in the encapsulated packet, and if the value of VXLAN ID in the header matches with the configured VXLAN segment VNID of the VTEP (e.g., the logical Layer 2 network ID of the VTEP), the leaf switch removes the encapsulation header and delivers the packet to client computer that is a hop away such as one of the client computers 112, 113 or 114 in the example of FIG. 1.

Example Processes

Figure 3:
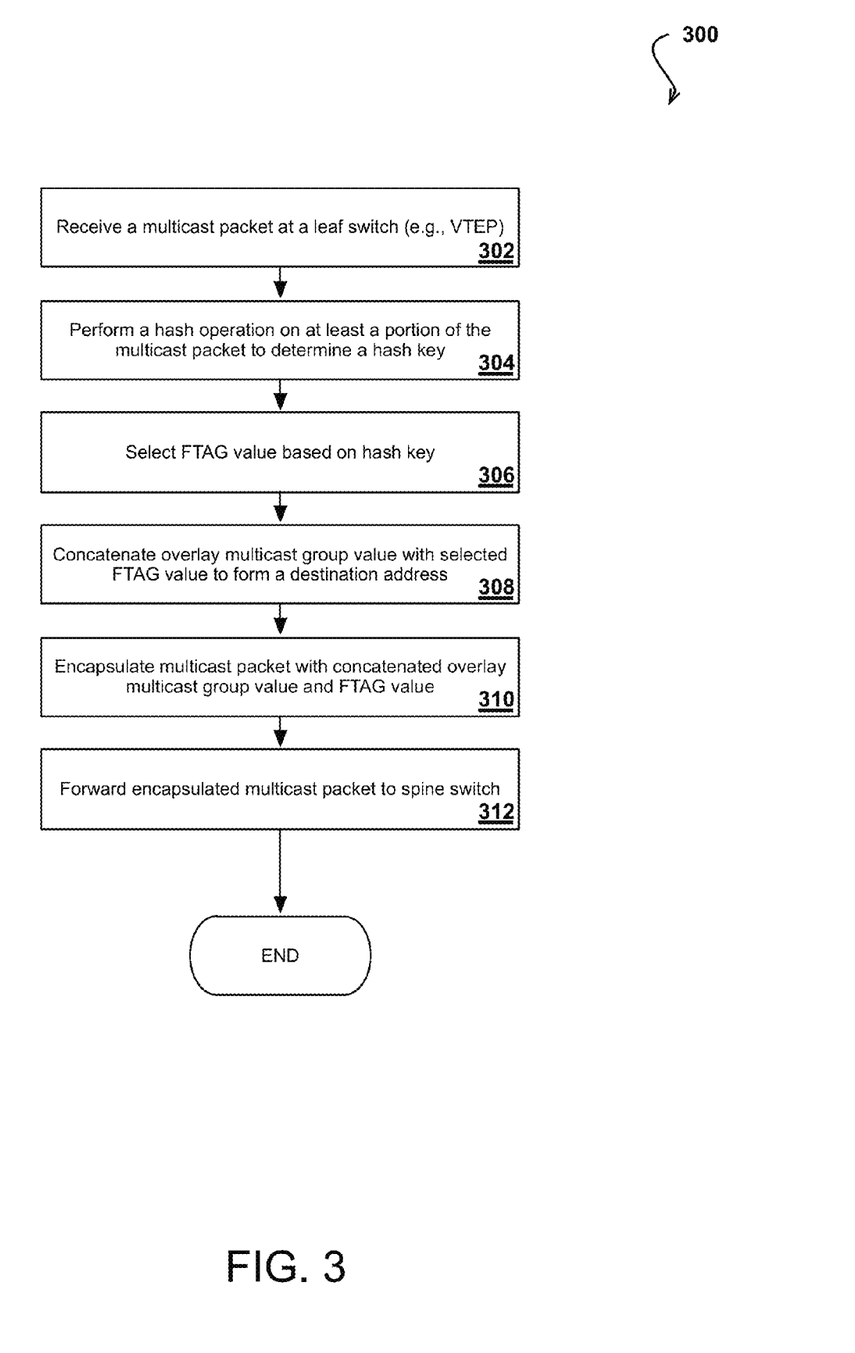
FIG. 3 conceptually illustrates an example process to provide multipath multicasting upon receiving a multicast packet at an ingress leaf switch in accordance with some embodiments of the subject technology.

FIG. 3 conceptually illustrates an example process 300 to provide multipath multicasting upon receiving a multicast packet at an ingress leaf switch in accordance with some embodiments of the subject technology. Referring to FIG. 1, the process 300 described below may be performed by an ingress leaf switch, such as the network element 115 that receives the incoming multicast packet 110 as described before.

At step 302, a multicast packet is received at a leaf switch corresponding to a VTEP in an overlay network. As mentioned before, the multicast packet may be included in a payload portion of an original Ethernet frame in an embodiment. At step 304, a hash operation is performed on at least a portion of the multicast packet to determine a hash key. For example, the hash operation may be performed on a portion of an IP header indicating flow information such as, but not limited to, an IP destination and/or source address, or information indicated a UDP and/or TCP port number among other types of information. At step 306, a FTAG value is selected based on the hash key. The FTAG value may corresponding to a respective multicast distribution tree in the overlay network. At step 308, an overlay multicast group value (e.g., multicast group address in the overlay network) is concatenated with the FTAG value to form a destination address. At step 310, the multicast packet is encapsulated with at least the concatenated overlay multicast group value and the FTAG value. As mentioned before, a VXLAN header may be appended to the original Ethernet frame including the multicast packet. A field corresponding to an outer IP destination address may be updated to include the value of the concatenated overlay multicast group value and the FTAG value in which the lower 4 bits of the outer IP destination address corresponds to the FTAG value. At step 312, the encapsulated packet is forwarded from the leaf switch to a spine switch (e.g., a root node of the multicast distribution tree corresponding to the FTAG value). In an embodiment, the spine switch is a device or network element at a next-hop from the leaf switch in the overlay network.

Figure 4:
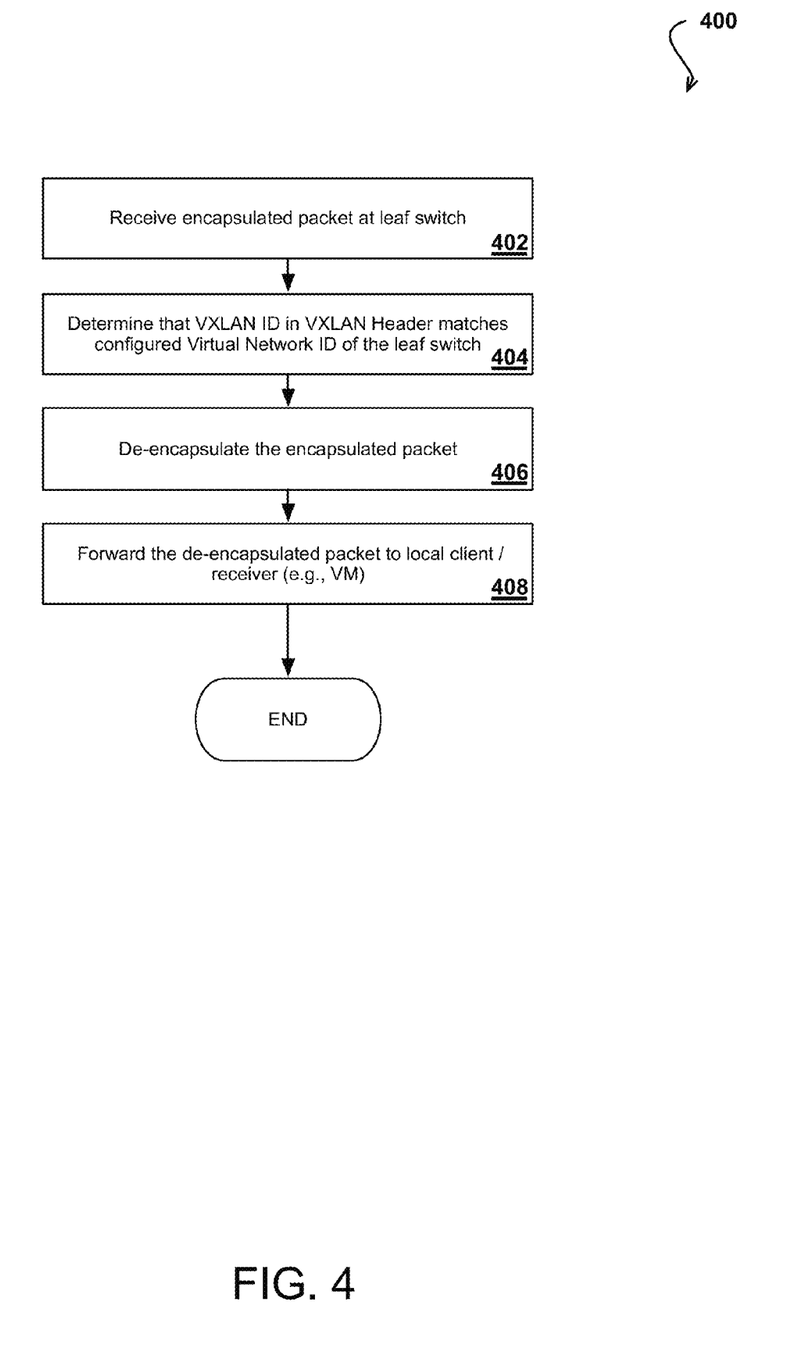
FIG. 4 conceptually illustrates an example process for de-encapsulating an encapsulated packet received at a leaf switch in accordance with some embodiments of the subject technology.

FIG. 4 conceptually illustrates an example process 400 for de-encapsulating an encapsulated packet received at a leaf switch in accordance with some embodiments of the subject technology.

At step 402, an encapsulated packet is received at a leaf switch. In an example, the encapsulated packet may be forwarded from a root spine switch to the leaf switch that represents a VTEP in an overlay network. At step 404, it is determined that VXLAN ID in a VXLAN header of the encapsulated packet matches a configured Virtual Network ID of the leaf switch. At step 406, the encapsulated packet is decapsulated by at least removing the VXLAN header. On the VXLAN header is removed, the decapsulated packet may include an original Ethernet frame that has the multicast packet in its payload portion. At step 408, the decapsulated packet is forwarded to a local client computer/receiver (e.g., VM), which may be one-hop away from the leaf switch.

Example Devices, Systems and Architectures

Figure 5:
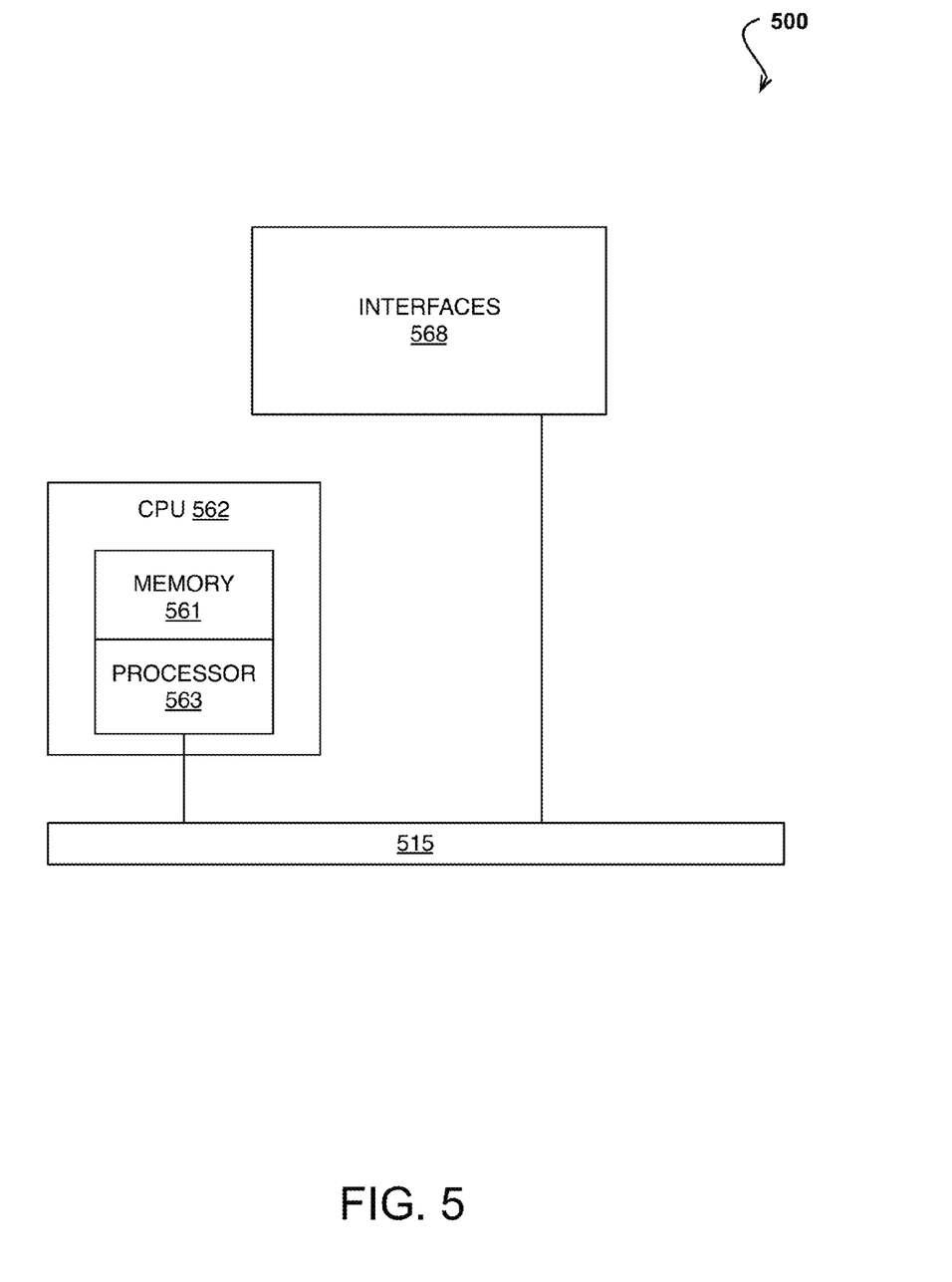
FIG. 5 illustrates an example network device according to some aspects of the subject technology.

FIG. 5 illustrates an exemplary network device 510 suitable for implementing the present invention. Network device 510 includes a master central processing unit (CPU) 562, interfaces 568, and a bus 515 (e.g., a PCI bus). When acting under the control of appropriate software or firmware, the CPU 562 is responsible for executing packet management, error detection, and/or routing functions, such as miscabling detection functions, for example. The CPU 562 preferably accomplishes all these functions under the control of software including an operating system and any appropriate applications software. CPU 562 may include one or more processors 563 such as a processor from the Motorola family of microprocessors or the MIPS family of microprocessors. In an alternative embodiment, processor 563 is specially designed hardware for controlling the operations of router 510. In a specific embodiment, a memory 561 (such as non-volatile RAM and/or ROM) also forms part of CPU 562. However, there are many different ways in which memory could be coupled to the system.

The interfaces 568 are typically provided as interface cards (sometimes referred to as "line cards"). Generally, they control the sending and receiving of data packets over the network and sometimes support other peripherals used with the router 510. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 562 to efficiently perform routing computations, network diagnostics, security functions, etc.

Although the system shown in FIG. 5 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 561) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 6A:
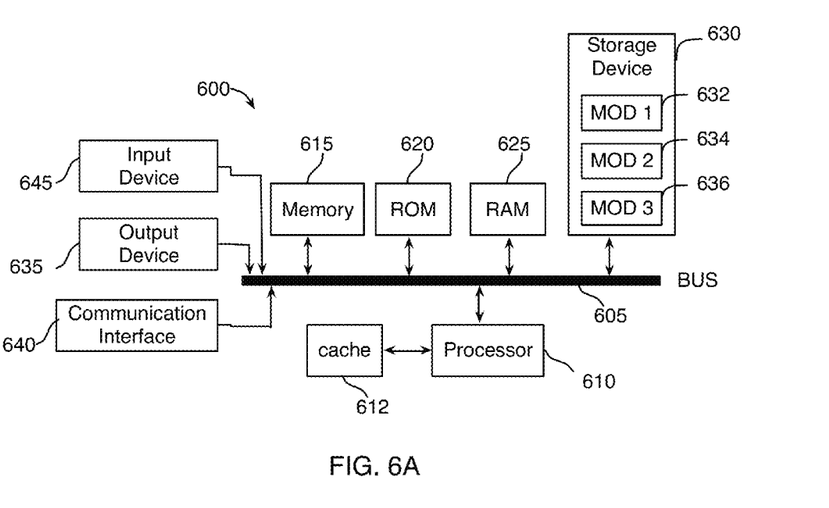
FIGS. 6A and 6B illustrate example system embodiments according to some aspects of the subject technology.
Figure 6B:
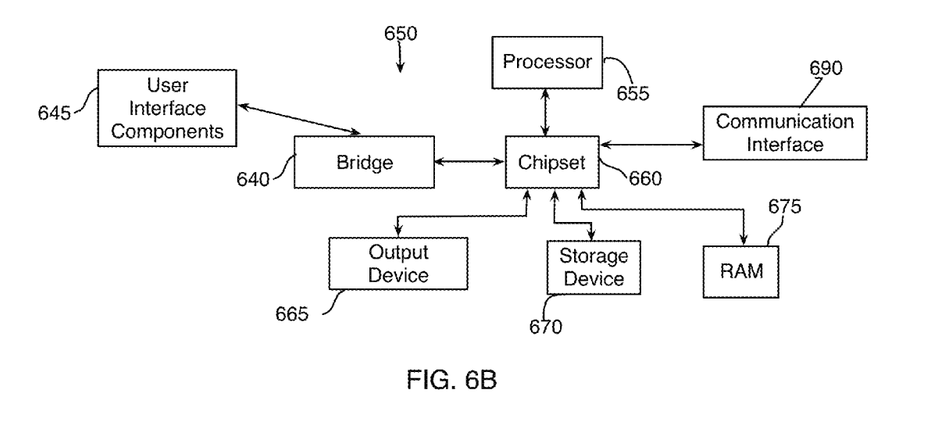

FIG. 6A, and FIG. 6B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 6A illustrates a conventional system bus computing system architecture 600 wherein the components of the system are in electrical communication with each other using a bus 605. Exemplary system 600 includes a processing unit (CPU or processor) 610 and a system bus 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 6 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B illustrates a computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655.

It can be appreciated that exemplary systems 600 and 650 can have more than one processor 610 or be part of a group or cluster of computing devices networked together to provide greater processing capability.

Figure 7:
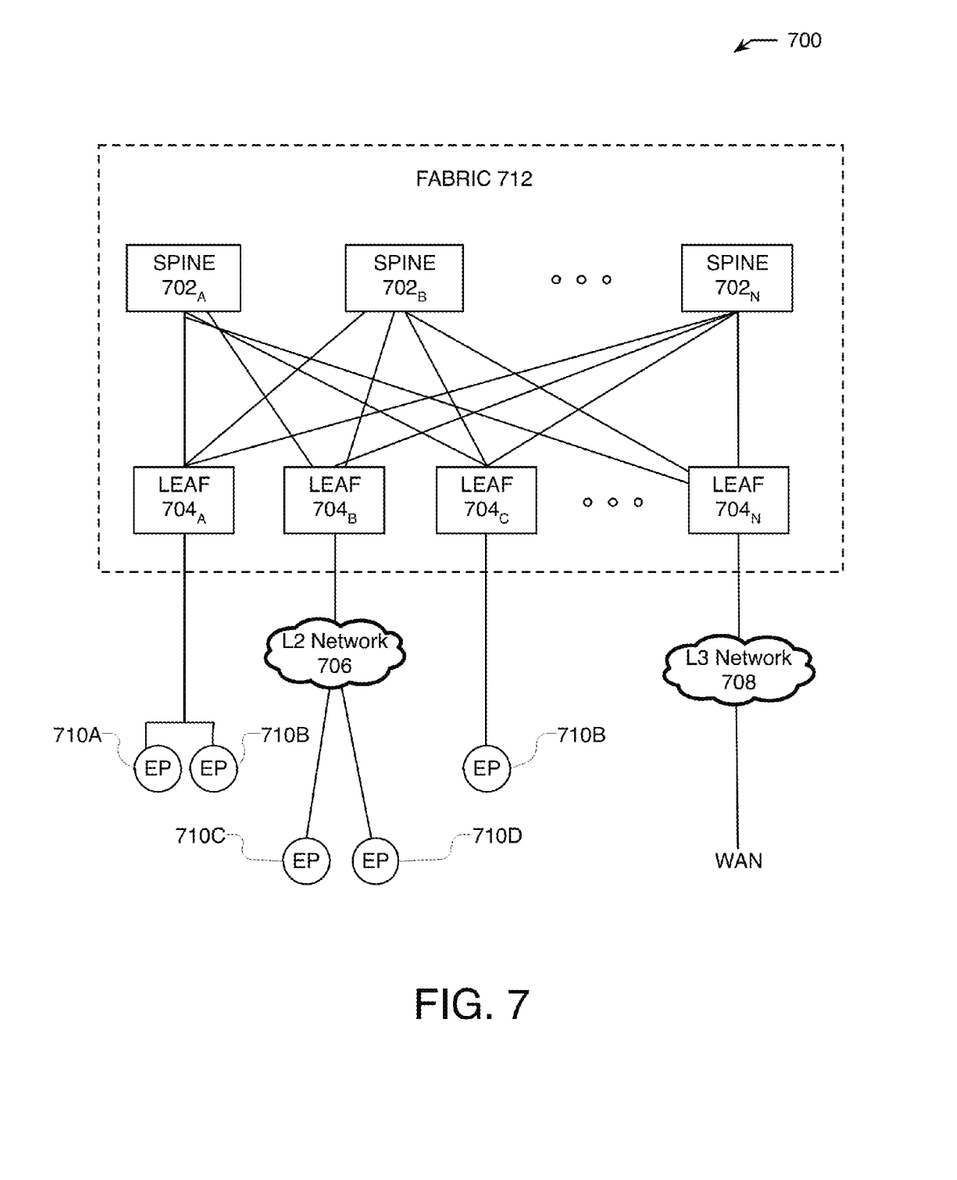
FIG. 7 illustrates a schematic block diagram of an example architecture for a network fabric.

FIG. 7 illustrates a schematic block diagram of an example architecture 700 for a network fabric 712. The network fabric 712 can include spine switches 702A, 702B, . . . , 702N (collectively "702") connected to leaf switches 704A, 704B, 704C, . . . , 704N (collectively "704") in the network fabric 712.

Spine switches 702 can be L3 switches in the fabric 712. However, in some cases, the spine switches 702 can also, or otherwise, perform L2 functionalities. Further, the spine switches 702 can support various capabilities, such as 40 or 10 Gbps Ethernet speeds. To this end, the spine switches 702 can include one or more 40 Gigabit Ethernet ports. Each port can also be split to support other speeds. For example, a 40 Gigabit Ethernet port can be split into four 10 Gigabit Ethernet ports.

In some embodiments, one or more of the spine switches 702 can be configured to host a proxy function that performs a lookup of the endpoint address identifier to locator mapping in a mapping database on behalf of leaf switches 704 that do not have such mapping. The proxy function can do this by parsing through the packet to the encapsulated, tenant packet to get to the destination locator address of the tenant. The spine switches 702 can then perform a lookup of their local mapping database to determine the correct locator address of the packet and forward the packet to the locator address without changing certain fields in the header of the packet.

When a packet is received at a spine switch 702$i$, the spine switch 702$i$ can first check if the destination locator address is a proxy address. If so, the spine switch 702$i$ can perform the proxy function as previously mentioned. If not, the spine switch 702$i$ can lookup the locator in its forwarding table and forward the packet accordingly.

Spine switches 702 connect to leaf switches 704 in the fabric 712. Leaf switches 704 can include access ports (or non-fabric ports) and fabric ports. Fabric ports can provide uplinks to the spine switches 702, while access ports can provide connectivity for devices, hosts, endpoints, VMs, or external networks to the fabric 712.

Leaf switches 704 can reside at the edge of the fabric 712, and can thus represent the physical network edge. In some cases, the leaf switches 704 can be top-of-rack ("ToR") switches configured according to a ToR architecture. In other cases, the leaf switches 704 can be aggregation switches in any particular topology, such as end-of-row (EoR) or middle-of-row (MoR) topologies. The leaf switches 704 can also represent aggregation switches, for example.

The leaf switches 704 can be responsible for routing and/or bridging the tenant packets and applying network policies. In some cases, a leaf switch can perform one or more additional functions, such as implementing a mapping cache, sending packets to the proxy function when there is a miss in the cache, encapsulate packets, enforce ingress or egress policies, etc.

Moreover, the leaf switches 704 can contain virtual switching functionalities, such as a virtual tunnel endpoint (VTEP) function as explained below in the discussion of VTEP 408 in FIG. 4. To this end, leaf switches 704 can connect the fabric 712 to an overlay network, such as overlay network 400 illustrated in FIG. 7.

Network connectivity in the fabric 712 can flow through the leaf switches 704. Here, the leaf switches 704 can provide servers, resources, endpoints, external networks, or VMs access to the fabric 712, and can connect the leaf switches 704 to each other. In some cases, the leaf switches 704 can connect EPGs to the fabric 712 and/or any external networks. Each EPG can connect to the fabric 712 via one of the leaf switches 704, for example.

Endpoints 710A-E (collectively "710") can connect to the fabric 712 via leaf switches 704. For example, endpoints 710A and 710B can connect directly to leaf switch 704A, which can connect endpoints 710A and 710B to the fabric 712 and/or any other one of the leaf switches 704. Similarly, endpoint 710E can connect directly to leaf switch 704C, which can connect endpoint 710E to the fabric 712 and/or any other of the leaf switches 704. On the other hand, endpoints 710C and 710D can connect to leaf switch 704B via L2 network 706. Similarly, the wide area network (WAN) can connect to the leaf switches 704C or 704D via L3 network 708.

Endpoints 710 can include any communication device, such as a computer, a server, a switch, a router, etc. In some cases, the endpoints 710 can include a server, hypervisor, or switch configured with a VTEP functionality which connects an overlay network, such as overlay network 400 below, with the fabric 712. For example, in some cases, the endpoints 710 can represent one or more of the VTEPs 408A-D illustrated in FIG. 4. Here, the VTEPs 408A-D can connect to the fabric 712 via the leaf switches 704. The overlay network can host physical devices, such as servers, applications, EPGs, virtual segments, virtual workloads, etc. In addition, the endpoints 710 can host virtual workload(s), clusters, and applications or services, which can connect with the fabric 712 or any other device or network, including an external network. For example, one or more endpoints 710 can host, or connect to, a cluster of load balancers or an EPG of various applications.

Although the fabric 712 is illustrated and described herein as an example leaf-spine architecture, one of ordinary skill in the art will readily recognize that the subject technology can be implemented based on any network fabric, including any data center or cloud network fabric. Indeed, other architectures, designs, infrastructures, and variations are contemplated herein.

Figure 8:
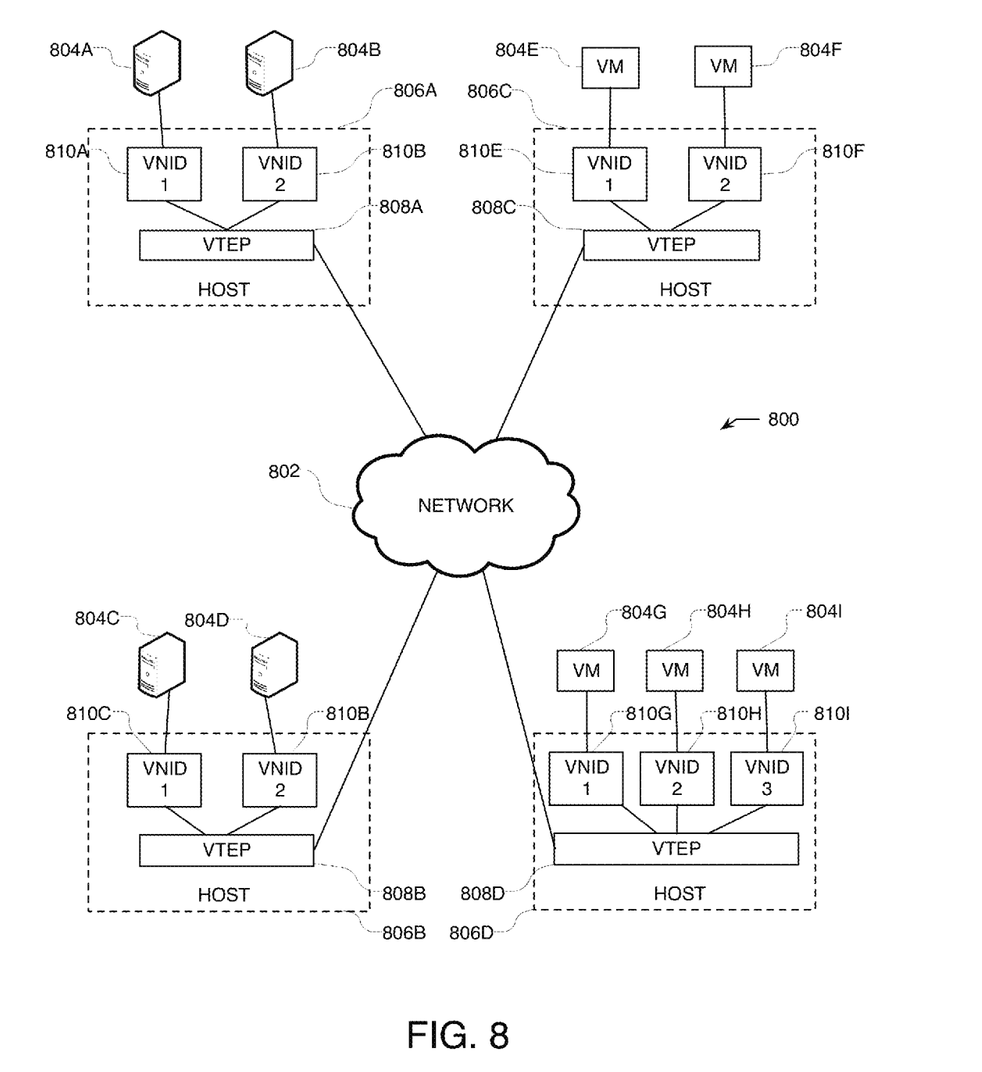
FIG. 8 illustrates an example overlay network.

FIG. 8 illustrates an exemplary overlay network 800. Overlay network 800 uses an overlay protocol, such as VXLAN, VGRE, VO3, or STT, to encapsulate traffic in L2 and/or L3 packets which can cross overlay L3 boundaries in the network. As illustrated in FIG. 8, overlay network 800 can include hosts 806A-D interconnected via network 802.

Network 802 can include a packet network, such as an IP network, for example. Moreover, network 802 can connect the overlay network 800 with the fabric 312 in FIG. 3. For example, VTEPs 808A-D can connect with the leaf switches 304 in the fabric 312 via network 802.

Hosts 806A-D include virtual tunnel end points (VTEP) 808A-D, which can be virtual nodes or switches configured to encapsulate and decapsulate data traffic according to a specific overlay protocol of the network 800, for the various virtual network identifiers (VNIDs) 810A-I. Moreover, hosts 806A-D can include servers containing a VTEP functionality, hypervisors, and physical switches, such as L3 switches, configured with a VTEP functionality. For example, hosts 806A and 806B can be physical switches configured to run VTEPs 808A-B. Here, hosts 806A and 806B can be connected to servers 804A-D, which, in some cases, can include virtual workloads through VMs loaded on the servers, for example.

In some embodiments, network 800 can be a VXLAN network, and VTEPs 808A-D can be VXLAN tunnel end points. However, as one of ordinary skill in the art will readily recognize, network 800 can represent any type of overlay or software-defined network, such as NVGRE, STT, or even overlay technologies yet to be invented.

The VNIDs can represent the segregated virtual networks in overlay network 800. Each of the overlay tunnels (VTEPs 808A-D) can include one or more VNIDs. For example, VTEP 808A can include VNIDs 1 and 2, VTEP 808B can include VNIDs 1 and 3, VTEP 808C can include VNIDs 1 and 2, and VTEP 808D can include VNIDs 1-3. As one of ordinary skill in the art will readily recognize, any particular VTEP can, in other embodiments, have numerous VNIDs, including more than the 3 VNIDs illustrated in FIG. 8.

The traffic in overlay network 800 can be segregated logically according to specific VNIDs. This way, traffic intended for VNID 1 can be accessed by devices residing in VNID 1, while other devices residing in other VNIDs (e.g., VNIDs 2 and 3) can be prevented from accessing such traffic. In other words, devices or endpoints connected to specific VNIDs can communicate with other devices or endpoints connected to the same specific VNIDs, while traffic from separate VNIDs can be isolated to prevent devices or endpoints in other specific VNIDs from accessing traffic in different VNIDs.

Servers 804A-D and VMs 804E-I can connect to their respective VNID or virtual segment, and communicate with other servers or VMs residing in the same VNID or virtual segment. For example, server 804A can communicate with server 804C and VMs 804E and 804G because they all reside in the same VNID, viz., VNID 1. Similarly, server 804B can communicate with VMs 804F, H because they all reside in VNID 2. VMs 804E-I can host virtual workloads, which can include application workloads, resources, and services, for example. However, in some cases, servers 804A-D can similarly host virtual workloads through VMs hosted on the servers 804A-D. Moreover, each of the servers 804A-D and VMs 804E-I can represent a single server or VM, but can also represent multiple servers or VMs, such as a cluster of servers or VMs.

VTEPs 808A-D can encapsulate packets directed at the various VNIDs 1-3 in the overlay network 800 according to the specific overlay protocol implemented, such as VXLAN, so traffic can be properly transmitted to the correct VNID and recipient(s). Moreover, when a switch, router, or other network device receives a packet to be transmitted to a recipient in the overlay network 800, it can analyze a routing table, such as a lookup table, to determine where such packet needs to be transmitted so the traffic reaches the appropriate recipient. For example, if VTEP 808A receives a packet from endpoint 804B that is intended for endpoint 804H, VTEP 808A can analyze a routing table that maps the intended endpoint, endpoint 804H, to a specific switch that is configured to handle communications intended for endpoint 804H. VTEP 808A might not initially know, when it receives the packet from endpoint 804B, that such packet should be transmitted to VTEP 808D in order to reach endpoint 804H. Accordingly, by analyzing the routing table, VTEP 808A can lookup endpoint 804H, which is the intended recipient, and determine that the packet should be transmitted to VTEP 808D, as specified in the routing table based on endpoint-to-switch mappings or bindings, so the packet can be transmitted to, and received by, endpoint 804H as expected.

However, continuing with the previous example, in many instances, VTEP 808A may analyze the routing table and fail to find any bindings or mappings associated with the intended recipient, e.g., endpoint 804H. Here, the routing table may not yet have learned routing information regarding endpoint 804H. In this scenario, the VTEP 808A may likely broadcast or multicast the packet to ensure the proper switch associated with endpoint 804H can receive the packet and further route it to endpoint 804H.

In some cases, the routing table can be dynamically and continuously modified by removing unnecessary or stale entries and adding new or necessary entries, in order to maintain the routing table up-to-date, accurate, and efficient, while reducing or limiting the size of the table.

As one of ordinary skill in the art will readily recognize, the examples and technologies provided above are simply for clarity and explanation purposes, and can include many additional concepts and variations.

As one of ordinary skill in the art will readily recognize, the examples and technologies provided above are simply for clarity and explanation purposes, and can include many additional concepts and variations.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

What is claimed is:

1. A system, comprising:
   at least one processor;
   a network interface; and
   memory including instructions that, when executed by the at least one processor, cause the system to:
   receive, over the network interface, a multicast packet for distributing to a set of receivers in an overlay network;
   perform a hash operation on at least a portion of the multicast packet to determine a hash key;
   select a forwarding tag (FTAG) value based at least on the hash key, wherein the FTAG value is associated with a multicast distribution tree in the overlay network, the multicast distribution tree being selected from a plurality of different multicast distribution trees in the overlay network;
   concatenate an overlay multicast group value with the FTAG value to provide a destination address;
   encapsulate the multicast packet with the concatenated overlay multicast group value and the FTAG value; and
   forward the encapsulated multicast packet to a network element located at a next-hop in the overlay network.

2. The system of claim 1, wherein the multicast packet is received by a virtual extensible local area network (VXLAN) tunnel end point (VTEP) in the overlay network.

3. The system of claim 1, wherein the hash operation is performed on at least one of an internet protocol (IP) destination address or an IP source address in an IP header of the multicast packet, information in an layer 2 (L2) header, or information in the multicast packet indicating a User Datagram Protocol (UDP) port number or a Transmission Control Protocol (TCP) port number.

4. The system of claim 1, wherein the overlay multicast group value comprises an overlay multicast group address.

5. The system of claim 4, wherein the FTAG value comprises a lower four bits of a header field including the concatenated overlay multicast group value.

6. The system of claim 1, wherein to encapsulate the multicast packet further causes the at least one processor to:
append a VXLAN header field to an Ethernet frame, the Ethernet frame including the multicast packet in an Ethernet payload portion of the Ethernet frame; and
update an outer IP destination address field in the VXLAN header with the concatenated overlay multicast group value and the FTAG value.

7. The system of claim 1, wherein the network element located at the next-hop in the overlay network comprises a spine switch.

8. The system of claim 7, wherein the spine switch comprises a root node in a multicast distribution tree associated with the FTAG value.

9. A computer-implemented method, comprising:
receiving, over a network interface, a multicast packet for distributing to a set of receivers in an overlay network;
performing a hash operation on at least a portion of the multicast packet to determine a hash key;
selecting a forwarding tag (FTAG) value based at least on the hash key, wherein the FTAG value is associated with a multicast distribution tree in the overlay network, the multicast distribution tree being selected from a plurality of different multicast distribution trees in the overlay network;
concatenating an overlay multicast group value with the FTAG value to provide a destination address;
encapsulating the multicast packet with the concatenated overlay multicast group value and the FTAG value; and
forwarding the encapsulated multicast packet to a network element located at a next-hop in the overlay network.

10. The computer-implemented method of claim 9, wherein the multicast packet is received by a virtual extensible local area network (VXLAN) tunnel end point (VTEP) in the overlay network.

11. The computer-implemented method of claim 9, wherein the hash operation is performed on at least one of an internet protocol (IP) destination address or an IP source address in an IP header of the multicast packet, information included in a layer 2 (L2) header, or information in the multicast packet indicating a User Datagram Protocol (UDP) port number or a Transmission Control Protocol (TCP) port number.

12. The computer-implemented method of claim 9, wherein the overlay multicast group value comprises an overlay multicast group address.

13. The computer-implemented method of claim 12, wherein the FTAG value comprises a lower four bits of a header field including the concatenated overlay multicast group value.

14. The computer-implemented method of claim 9, wherein encapsulating the multicast packet further comprises:
appending a VXLAN header field to an Ethernet frame, the Ethernet frame including the multicast packet in an Ethernet payload portion of the Ethernet frame; and
updating an outer IP destination address field in the VXLAN header with the concatenated overlay multicast group value and the FTAG value.

15. The computer-implemented method of claim 9, wherein the network element located at the next-hop in the overlay network comprises a spine switch.

16. The computer-implemented method of claim 15, wherein the spine switch comprises a root node in a multicast distribution tree associated with the FTAG value.

17. A non-transitory computer-readable medium including instructions stored therein that, when executed by at least one computing device, cause the at least one computing device to:
receive, over a network interface, a multicast packet for distributing to a set of receivers in an overlay network;
perform a hash operation on at least a portion of the multicast packet to determine a hash key;
select a forwarding tag (FTAG) value based at least on the hash key, wherein the FTAG value is associated with a multicast distribution tree in the overlay network, the multicast distribution tree being selected from a plurality of different multicast distribution trees in the overlay network;
concatenate an overlay multicast group value with the FTAG value to provide a destination address;
encapsulate the multicast packet with the concatenated overlay multicast group value and the FTAG value; and
forward the encapsulated multicast packet to a network element located at a next-hop in the overlay network.

18. The non-transitory computer-readable medium of claim 17, wherein the overlay multicast group value comprises an overlay multicast group address, and the FTAG value comprises a lower four bits of a header field including the concatenated overlay multicast group value.

* * * * *